Figures 1, 2:
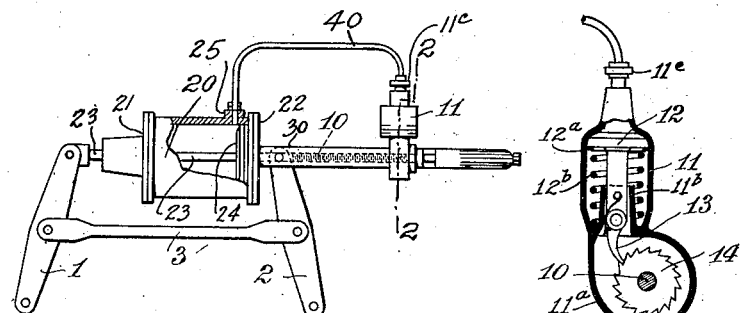

K. A. BECKMAN.
AUTOMATIC SLACK ADJUSTER FOR RAILWAY BRAKES.
APPLICATION FILED MAR. 23, 1918.

1,377,386.

Patented May 10, 1921.

Inventor:
Knut Anton Beckman

UNITED STATES PATENT OFFICE.

KNUT ANTON BECKMAN, OF STOCKHOLM, SWEDEN.

AUTOMATIC SLACK-ADJUSTER FOR RAILWAY-BRAKES.

1,377,386. Specification of Letters Patent. Patented May 10, 1921.

Original application filed December 28, 1914, Serial No. 879,337. Divided and this application filed March 23, 1918. Serial No. 224,269.

*To all whom it may concern:*

Be it known that I, KNUT ANTON BECKMAN, a citizen of the Kingdom of Sweden, and resident of Observatoriegatan 22, Stockholm, Sweden, (whose post-office address is Observatoriegatan 22, Stockholm, Sweden, have invented certain new and useful Improvements in Automatic Slack-Adjusters for Railway-Brakes, of which the following is a specification.

This invention relates to means for taking up the slack in brake mechanisms at the commencement of the application of the brakes and the present embodiment is a division of my application, Serial No. 879,337 filed December 28, 1914 on which patent No. 1,283,634 dated November 5, 1918 issued.

On account of a brake mechanism not being an absolutely stiff or rigid system it is impossible that the relative movements of the different members of the device may be determined by geometrical laws alone. Practical trials have also shown that only about one fourth of the stroke of the brake cylinder piston answers to the movement of the brake shoes. The remaining three fourths of the stroke are used for bending, stretching and other deformation of the brake mechanism.

Hence it follows that when the regulating of the slack is made dependent on the travel or stroke of a certain member in the brake mechanism, this must influence the accuracy of the regulating. For the stroke of the above mentioned member is also dependent on the power with which the brake is applied on account of the elasticity of the brake mechanism, or, what is the same, the travel or stroke of any member of a brake mechanism corresponds to the sum of the stroke during two different periods, of which one lasts from the beginning of the braking until the play or slack is taken up and the other one from this moment until the braking is finished.

The length of the stroke during the first of these periods is dependent on the play only, the length of the stroke during the second period is a function of the braking power and the elasticity in the parts of the brake mechanism placed between the above mentioned member and the brake blocks. Thus it is evident, that the same stroke may be obtained with smaller plays and more powerful braking or with greater plays and less braking power, and that, if the regulation of the play exclusively is made dependent on the maximum stroke of certain members of the brake device, no correct regulation can be procured, as the braking power is not always the same.

Therefore the regulation according to the present invention is not based upon the maximum stroke of a brake member, as is the case in hitherto known devices, but upon a part only of the stroke.

In consequence of this the regulating member at the present invention must be connected with the turnbuckle, in such a way that the play is taken up during the first mentioned period of the stroke. The tension during the second period and the friction thus arising in the threads of the turnbuckle stops further turning of the turnbuckle or nut and prevents the reduction of the play from exceeding the limit fixed therefor. The work of the regulating member upon the turnbuckle or ratchet nut by continued braking during the second period, when the turning of the turnbuckle is stopped, is taken up by an elastic member, for instance a spring as in applicant's U. S. Patent No. 1,283,634 from which the present application is a division.

The most important differences between the known slack adjusters and applicant's are as follows:

1. The adjusting device is connected with the brake in such a way that the turnbuckle is turned at each braking, until this turning is stopped by the friction in the threads of the turnbuckle.

2. The strain in the brake mechanism arising when braking is used for limiting the turning of the turnbuckle.

3. The reduction of the play takes place before the braking period proper.

Thus by the present invention neither the elasticity of the brake device nor the braking power have any influence upon the size of the play.

Figure 1 of the accompanying drawings represents a side elevation of a portion of a power brake mechanism embodying the present form of my invention.

Fig. 2 represents a transverse section thereof on line 2—2 of Fig. 1.

The same reference numbers indicate corresponding parts in both figures.

In the accompanying drawings which represent a convenient arrangement of parts for carrying out this embodiment of the invention, a brake cylinder 20 is provided with the usual front head 21 and the usual rear head 22. A piston rod 23 projects through the front head 21 and carries at its inner end within the cylinder the usual piston 24 which operates in the usual manner of brake cylinder pistons. This brake cylinder is also provided with a lateral air port 25 disposed adjacent to the rear head 22 and to the starting point of the piston for the purpose hereinafter described. A screw rod support 30 extends rearward from the rear head 22 of the brake cylinder and a screwrod 10 is movable endwise in said support substantially in alinement with said piston. Brake levers 1 and 2 are pivotally connected at their inner ends with said piston rod 23 and said screwrod 10 respectively and a connecting rod 3 is pivoted at its opposite ends to said levers between their ends. The screwrod 10 is provided with a ratchet nut 14 fixed thereon.

A slack adjuster cylinder 11 is provided with a housing 11$^a$ through which the screwrod 10 projects and within which its ratchet nut 14 is inclosed. The slack adjuster cylinder is provided at its lower end with an inner tubular guideway 11$^b$ opening into said housing and at its upper end with a nipple 11$^c$. A piston 12 plays within said tube of the slack adjuster cylinder and is provided at its lower end with a spring pawl 13 which engages said ratchet nut for actuating said screwrod and at its upper end with a diaphragm 12$^a$. An expansive spring 12$^b$ is disposed between the bottom of the cylinder and the diaphragm. A pipe 40 connects the air port 25 of the brake cylinder 20 with the nipple 11$^c$ of the cylinder 11. This pipe conveys air under pressure when the brake piston is actuated from the brake cylinder 20 to the slack adjuster cylinder 11. This air serving as a motive fluid depresses the piston 12 against the tension of the spring 12$^b$ and the pawl 13 turns the ratchet nut 14 and the screwrod 10. When the pressure is released the spring 12$^b$ lifts the pistons 12 and retracts the pawl 13 without turning the rod 10.

It will be noted that in the present invention the air pipe 40 leading from the brake cylinder to the slack adjusting cylinder is connected with the brake cylinder at the right end of the latter, i. e. at the end where the brake piston begins its stroke. In the prior art such pipe is connected with the brake cylinder at a place where the piston stands the moment when the maximal braking begins in such a way that slack adjusting cannot take place until the maximal strain occurs. According to the present invention the adjusting takes place before there is any strain in the mechanism, i. e. at the very beginning of the movement of the brake piston, and the adjusting movement is checked when said strain begins.

Thus it is evident that in the present slack adjuster the elasticity of the brake device does not influence the slack adjusting.

By this invention the adjusting is independent of the elasticity in the brake mechanism and consequently also of the amount of braking power used for applying the brakes, contrary to the usual slack adjusters where the stroke of every part of the brake rigging is a function of the travel of some part as well as of the amount of braking power applied to the mechanism owing to the elasticity of the mechanism.

The present slack adjuster is also entirely independent of the playrooms in the bolt holes and the like of the brake mechanism.

Having thus described my invention I declare that what I claim is:—

1. In an automatic slack adjuster the combination of a brake setting mechanism, a slack adjuster connected therewith, and an auxiliary yielding device connected with the brake setting mechanism and adapted to take up the excess motion of parts of said mechanism until the frictional resistance of other parts arrests this movement, said auxiliary yielding device comprising a pneumatic motor for operating said slack adjuster, and a pipe connecting said pneumatic motor with the brake cylinder adjacent to the rear end thereof and to the starting point of its piston.

2. The combination of a brake cylinder provided with a lateral air port adjacent its rear head, a piston therein having a piston rod projecting through the front head of said cylinder, an external screwrod support connected with the rear head, a screwrod movable endwise in said support in alinement with said piston rod, brake levers connected at their inner ends with said piston rod and screwrod respectively, a connecting rod pivoted at its opposite ends to said levers intermediately thereof, a ratchet nut on said screwrod, a slack adjuster cylinder adjacent to said ratchet nut, a piston in said slack adjuster cylinder provided with a rod carrying a pawl engaging said ratchet nut, a spring for yieldingly holding said piston to its seat, and a pipe connecting said brake cylinder with said slack adjuster cylinder, the connection of said pipe with the brake cylinder being adjacent to the rear end thereof and operative during the initial movement of the brake piston to supply a motive fluid to said slack adjuster cylinder, said motive fluid serving as an elastic resistance during the working stroke of said brake piston.

In testimony whereof, I have signed my name to this specification in the presence of two subscribing witnesses.

KNUT ANTON BECKMAN.

Witnesses:
    JACOB BAGGE,
    MISS SIMONSSON.